June 16, 1936.  J. B. MIDDAUGH  2,044,179
DEHAIRING MACHINE
Filed Oct. 18, 1933  5 Sheets-Sheet 1

Inventor:
John B. Middaugh
By Rector, Hibben, Davis & Macauley, attys.

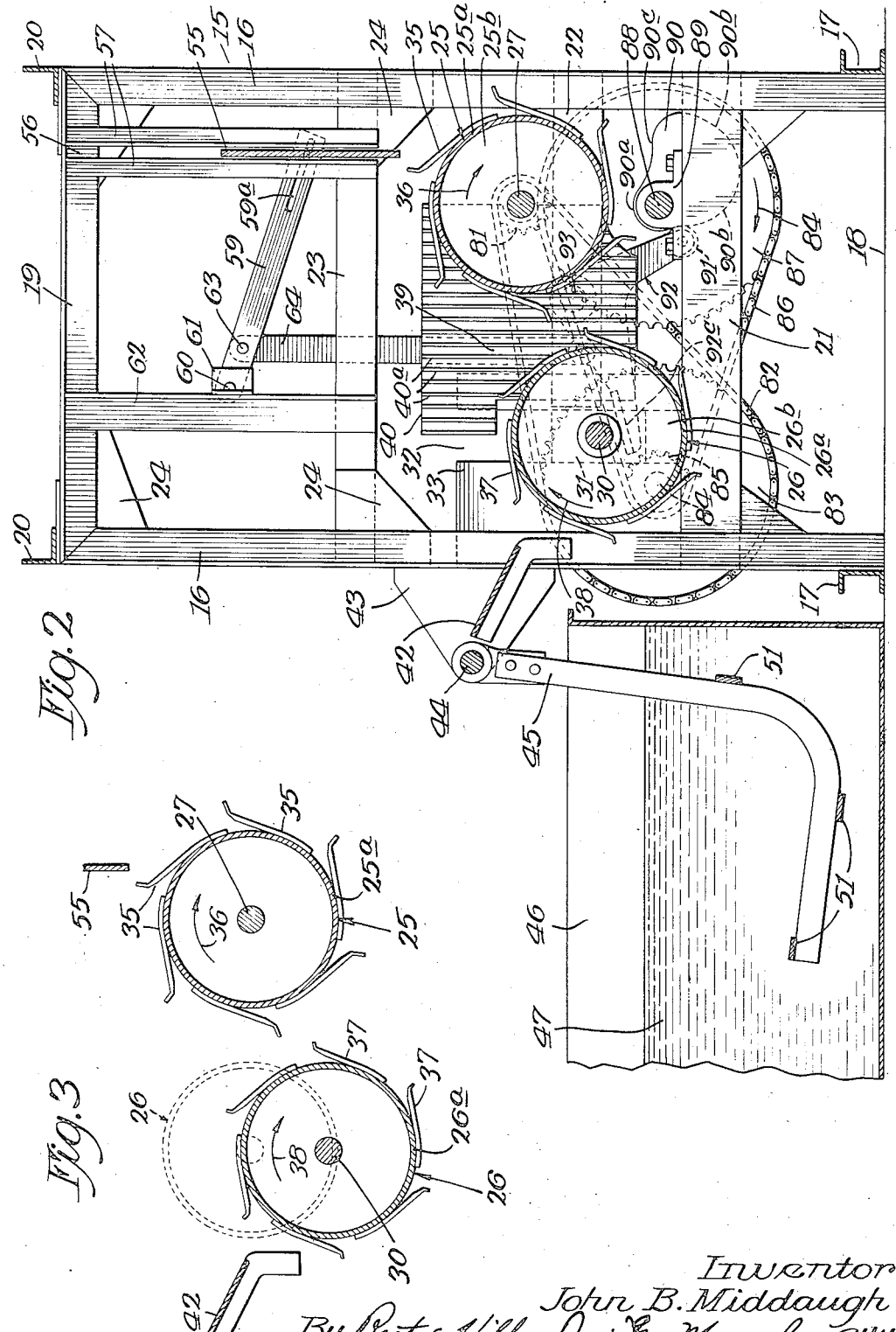

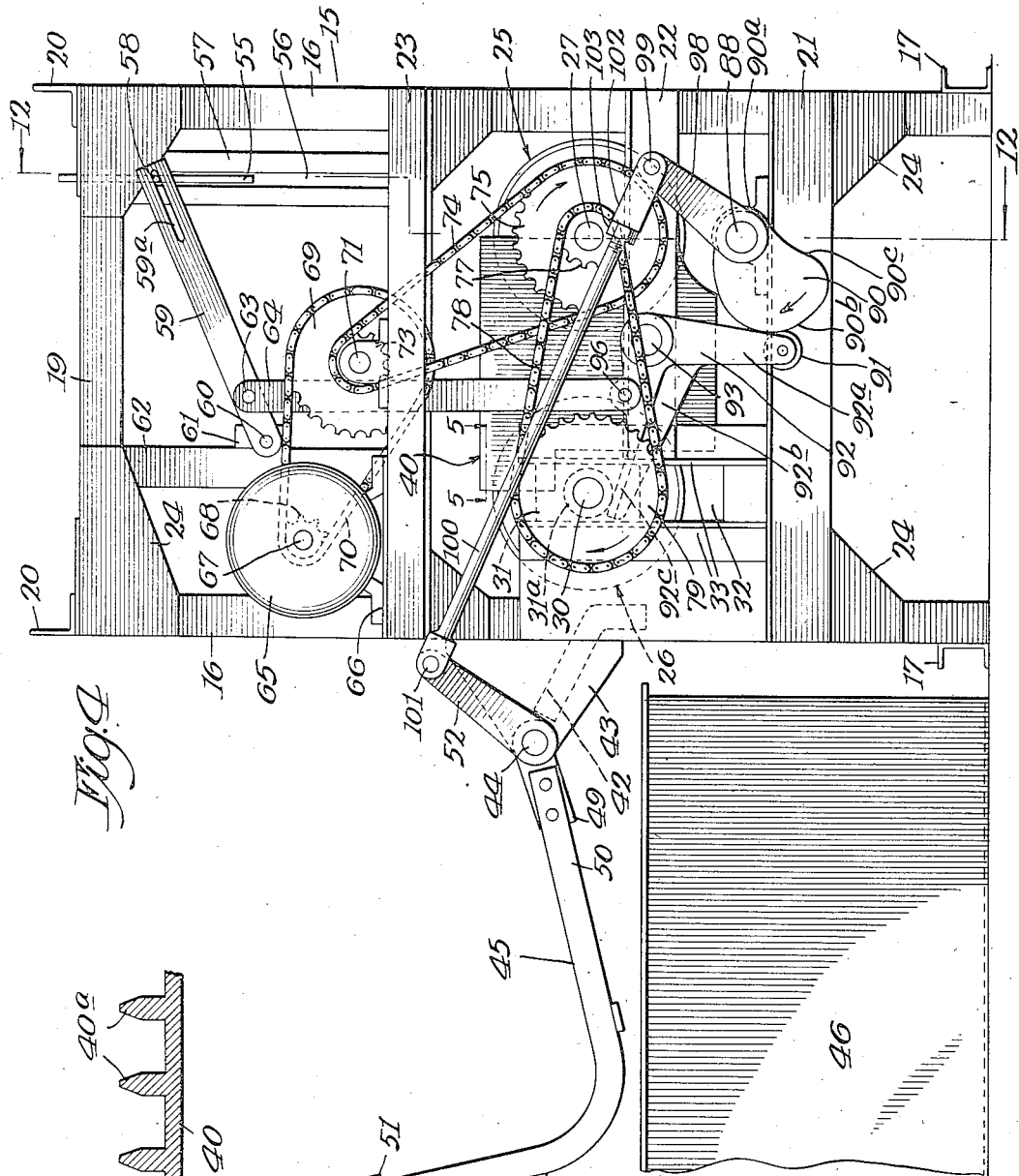

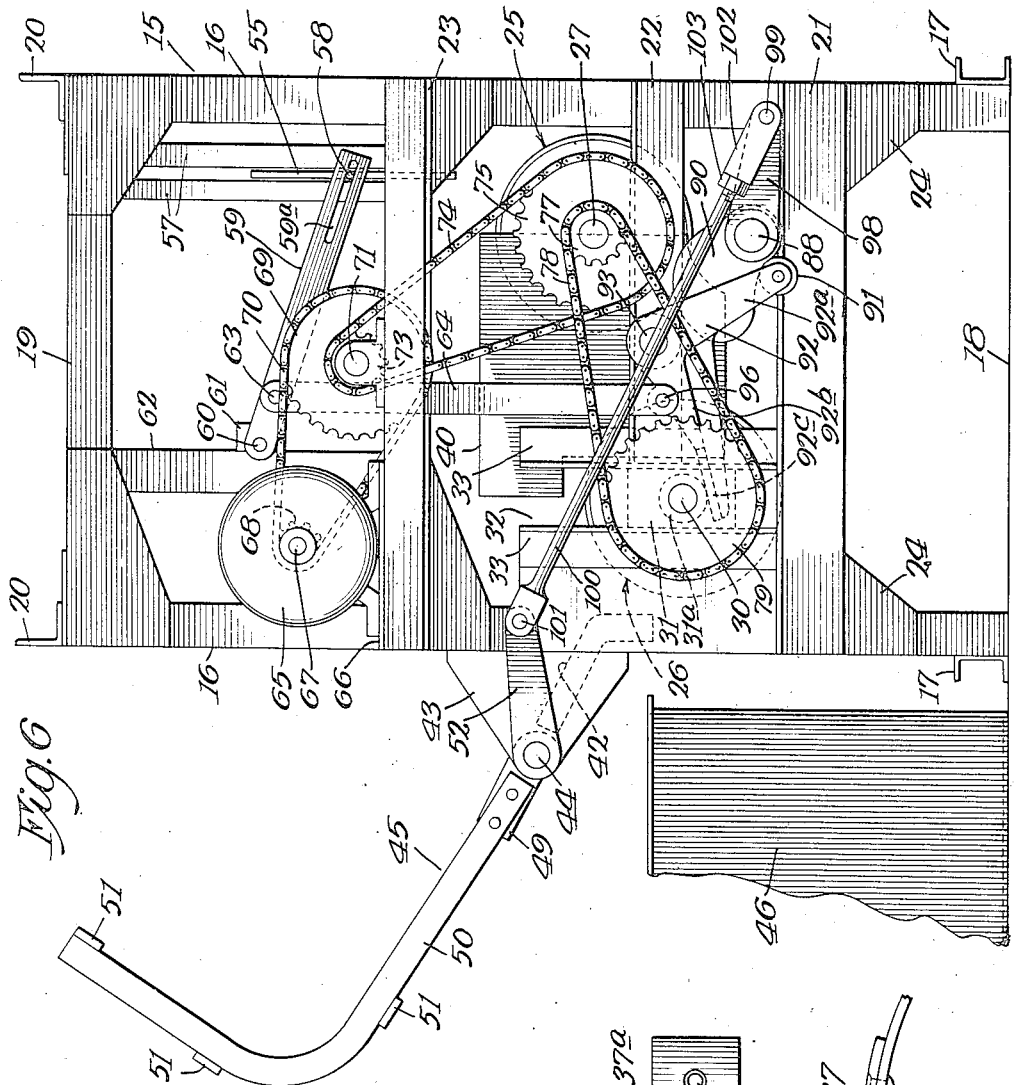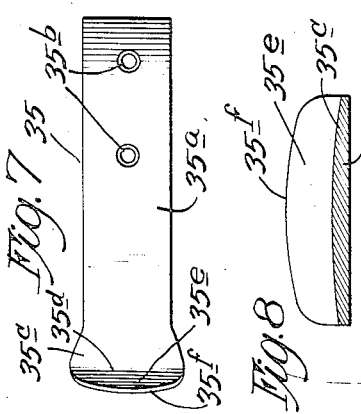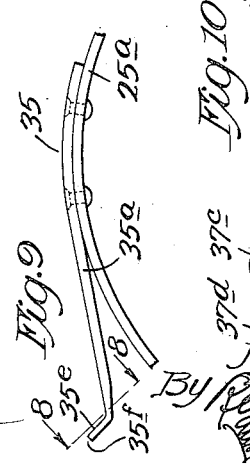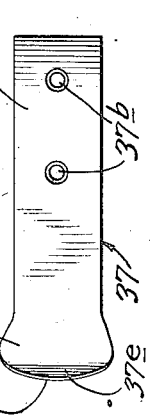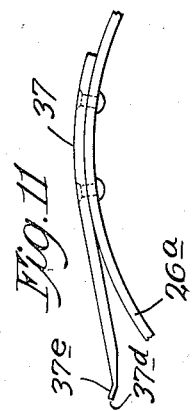

Patented June 16, 1936

2,044,179

UNITED STATES PATENT OFFICE 2,044,179

DEHAIRING MACHINE

John B. Middaugh, Chicago, Ill., assignor, by mesne assignments, to Packers Equipment Development Company, Chicago, Ill., a corporation of Illinois Application October 18, 1933, Serial No. 694,083

16 Claims. (Cl. 17—16)

This invention relates to improvements in dehairing machines and its purpose is to provide an improved and simplified form of apparatus capable of use in the meat packing industry, for efficiently removing hair from the hides of hogs and other animals. The principal object of the invention is to provide an improved form of dehairing machine comprising improved means for agitating the carcass of the hog or the like and removing the hair therefrom. A further object of the invention is to provide a dehairing machine comprising a device having a plurality of movements, one of which movements is adapted to remove hair from the carcass of the hog or the like, while another movement is adapted to effect the discharge of the carcass from the machine. Still another object of the invention is to provide a dehairing machine comprising a pair of rotatable dehairing devices, in combination with means for effecting a bodily movement of one of said devices for discharging the dehaired carcass from the machine. Another object of the invention is to provide a dehairing machine comprising improved means for effectually removing the hair from the end portions of the carcass as the carcass is being rolled about in the machine by the devices which are adapted to remove hair from the remaining portions thereof. Another important object of the invention is to provide a dehairing machine comprising a feeding device for moving the carcasses into the machine, relatively movable dehairing devices, one of which has a bodily movement, for operating upon the carcass within the machine, and a gate for controlling the discharge of the dehaired carcass from the machine, in combination with means for effecting the operation of the feeding means, the dehairing devices, the discharge gate and the bodily movement of one of said devices, in predetermined sequence whereby the dehairing of the carcasses of hogs and the like may be carried on very rapidly and more efficiently than has heretofore been possible. Another important object of the invention is to provide a dehairing machine comprising a rotatable cylinder provided with a plurality of projecting blades of improved form which are adapted to engage the carcass of the animal to be dehaired and which, because of their peculiar shape and formation, are adapted to bring about a perfect removal of the hair from the carcass. Other objects of the invention relate to various features of construction and arrangement which will appear more fully hereinafter.

The nature of the invention will be understood from the following specification taken with the accompanying drawings, in which,—

Fig. 2 shows a vertical section taken on line 2—2 of Fig. 1, looking in the direction of the arrows;

Fig. 3 shows a vertical section through the dehairing cylinders, the feed board and the discharge gate, showing, by dotted lines, the position of one of these cylinders when it is elevated to effect the discharge of the dehaired carcass from the machine;

Fig. 4 shows an end elevation of the machine, looking toward the right as viewed in Fig. 1, and illustrating the relative positions of the loading device, the discharge cylinder and the discharge gate when the parts are in readiness for the discharge of a dehaired carcass from the machine;

Fig. 5 shows an enlarged detail section on the line 5—5 of Fig. 4, illustrating one of the stationary dehairing devices adapted for operation upon an end portion of a carcass;

Fig. 6 shows an end elevation similar to that of Fig. 4 when the feeding device is elevated for discharging one or more carcasses into the machine and after the movable cylinder and the discharge gate have been lowered following the discharge of a dehaired carcass;

Fig. 7 shows a plan view of one of the improved dehairing blades which are carried by one of the rotatable cylinders of the machine;

Fig. 8 shows an enlarged section through an end portion of one of the blades shown in Fig. 7, the section being taken on the line 8—8 of Fig. 9;

Fig. 9 shows an enlarged end elevation of a portion of one of the cylinders, illustrating the relation thereto of one of the dehairing blades illustrated in Fig. 7;

Fig. 10 shows a plan view of a modified form of scraper blade which is preferably employed with the cylinder which normally occupies a lower position and which has an upward movement for the purpose of discharging the carcass from the machine;

Fig. 11 is a partial sectional view through the lower cylinder illustrating the application thereto of the form of blade illustrated in Fig. 10.

Figure 1:
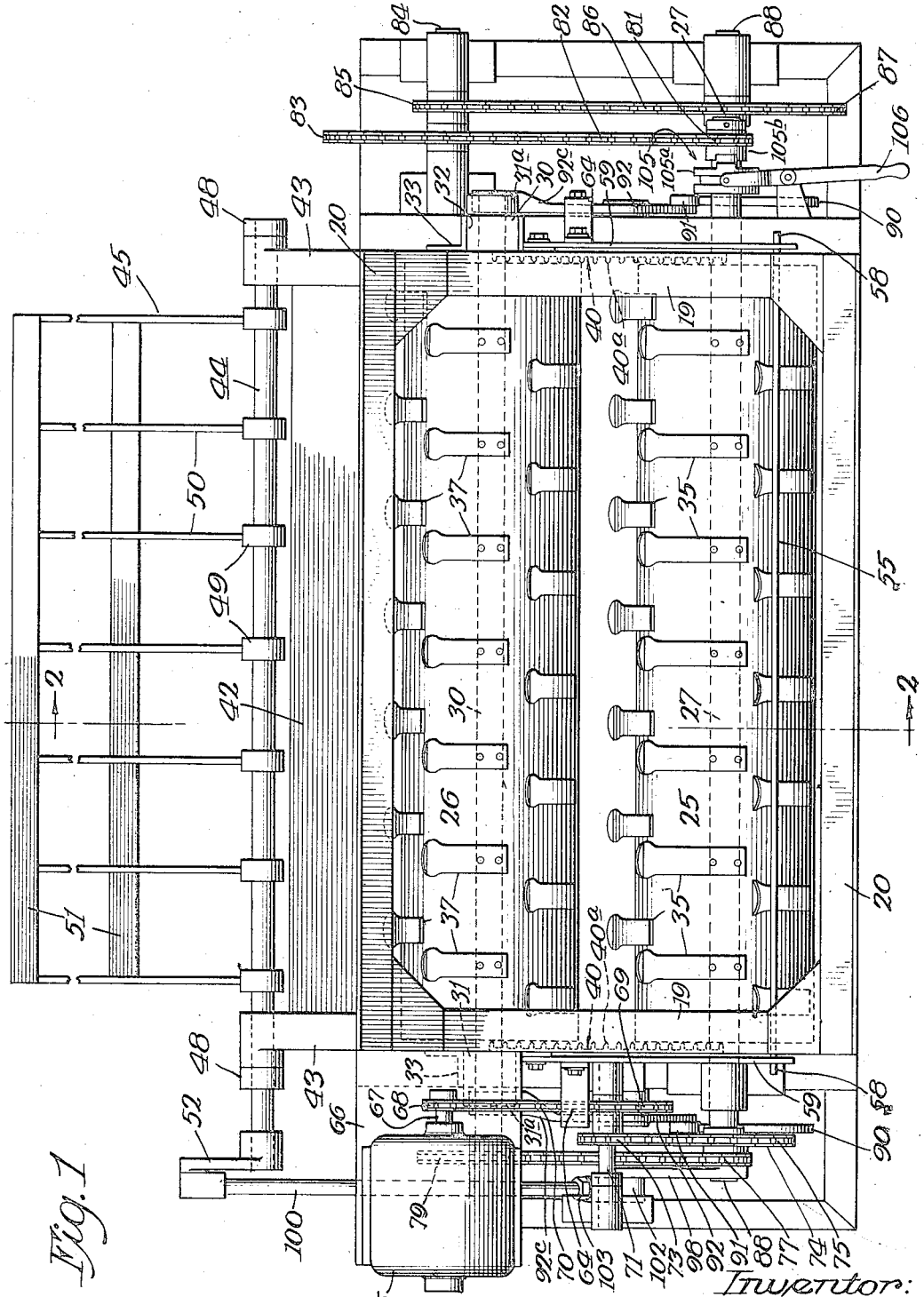
Figure 1 shows a top plan view of a dehairing machine embodying the features of the present invention.
Figure 12:
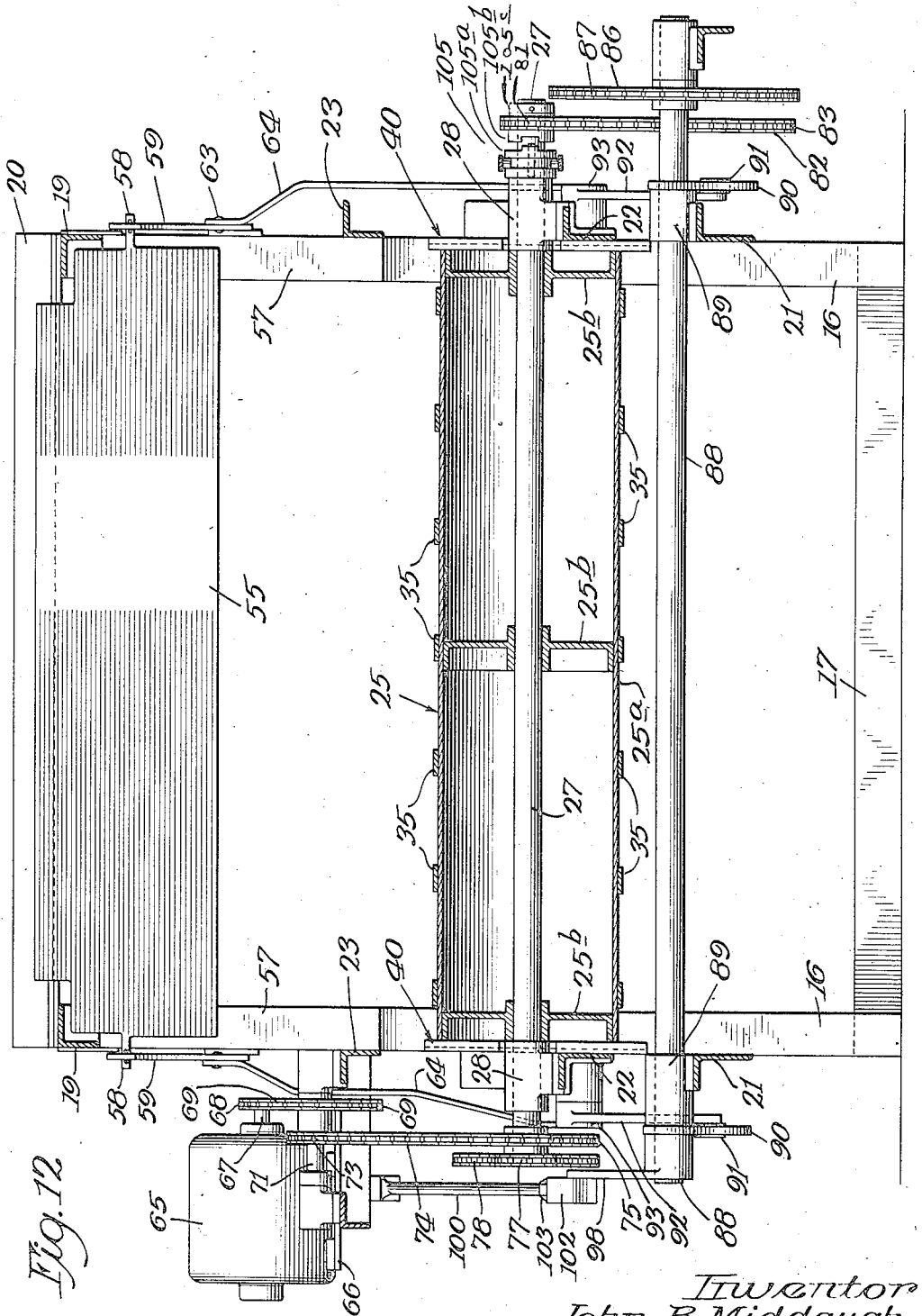
Fig. 12 is a vertical section taken on the line 12—12 of Fig. 4.

As illustrated in the drawings, the invention is embodied in a machine comprising a frame 15, of skeleton-like construction, including four upright corner frame members 16 which have their lower ends connected together in pairs at the front and rear of the machine by horizontal channel members 17 adapted to rest upon a floor or other support 18 to which the machine is preferably secured. The upright frame members 16 are secured together at their upper ends by transverse frame members 19 running from the front to the rear of the machine and the upper ends of the upright frame members are also connected in pairs at the front and rear of the machine by angle bars or frame members 20. Each end frame of the machine also includes, in addition to two upright members 16 and an upper horizontal member 19, a lower horizontal frame member 21, spaced above the floor or foundation 18, a lower intermediate horizontal member 22 and an upper intermediate member 23. The connections of the horizontal frame members with the upright frame members are preferably reinforced by gusset plates 24 and all of the frame members are riveted or otherwise secured together to provide a rigid construction.

Within the enclosure formed by the frame 15, there are mounted a pair of rotatable drums or cylinders 25 and 26, the latter of which, in addition to a motion of rotation, is capable of being moved bodily upward for effecting the discharge of the carcass from the machine, as heretofore referred to. The drum 25 comprises an outer cylindrical portion 25$^a$ formed of steel or the like and supported by end walls or heads 25$^b$ which are secured to a shaft 27 mounted to rotate in bearings 28 which are secured to the upper sides of the lower intermediate frame members 22. The drum 26 comprises a cylindrical portion 26$^a$ carried by radial end walls or heads 26$^b$ which are secured upon a shaft 30. The shaft 30 is mounted at its ends for rotation in bearing blocks 31 which are slidable vertically in guides 32 formed by upright frame members 33 which engage grooves in the bearing blocks so that the latter are held against displacement endwise of the shaft while being permitted to move freely in a vertical direction. The guides 32 terminate at their lower ends at such points as to hold the bearing blocks 31 normally in the positions shown in Fig. 2 which corresponds with the running position of the drum 26 during the dehairing operation.

The drum 25 comprises a plurality of scraping blades 35 which are preferably in the form shown particularly in Figs. 7, 8, and 9. Each blade 35 comprises an arm 35$^a$ provided with holes 35$^b$ adapted to be engaged by rivets or the like by means of which it is secured to the cylindrical portion 25$^a$ of the drum. Each arm 35$^a$ has a slight curvature in a longitudinal direction so that one portion thereof conforms to the curvature of the drum, as shown in Fig. 9, while the remaining portion thereof projects tangentially from the drum to terminate at its end in an enlarged head 35$^c$ which is of greater width than the arm and which is turned outwardly from the arm along a line 35$^d$ to form a tip 35$^e$ having a rounded end surface 35$^f$ and having a location in a plane extending substantially radially of the drum. These blades are formed of hardened steel having sufficient resiliency to permit them to yield in contact with the surface being scraped and the rounded outer end surface 35$^f$ is adapted to engage the hide of the carcass for the purpose of removing the hair therefrom as the drum, carrying these blades, is rotated in the direction of the arrow 36, shown in Fig. 2. The blades 35 are distributed throughout the surface of the drum and are arranged in staggered relationship in adjacent rows so that, as the drum rotates, some portions of the various scraping blades carried by the drum are presented to substantially all of the surfaces of the carcass being scraped.

The other drum 26, which preferably operates at a slower speed than the drum 25, is provided with a plurality of scraping blades 37 which preferably have the form shown particularly in Figs. 10 and 11. It will be seen that each blade comprises an arm 37$^a$ provided with holes 37$^b$ adapted for engagement by rivets or the like by which the arm is secured to the cylindrical portion 26$^a$ of the drum. Each blade 37 terminates in an enlarged head 37$^c$ located at the outer end of that portion of the arm which extends tangentially through the drum, and this enlarged head, which is wider than the arm, terminates in a rounded end surface 37$^d$ which is adapted to engage the surface of the carcass for effecting the scraping operation. This blade is turned outwardly at its tip, to a slight extent, as shown at 37$^e$, but this outward turning is preferably less marked than in the case of the scraping blade 35 and it has been found that this combination of scraping blades of special form on the two rotatable drums is adapted to bring about a very efficient scraping of the hide of the carcass with a complete removal of the hair therefrom. During the dehairing operation, the drum 26 is adapted to rotate in the direction indicated by the arrow 38 in Fig. 2 and it thus has the same direction of rotation as the drum 25, located at a higher elevation and operated at a higher speed. When one or more carcasses occupy the position 39 somewhat above and partially between the two rotating drums, the carcasses are tumbled about and rolled over each other, in a counter-clockwise direction, as viewed in Fig. 2, with the result that the dehairing operation is very quickly performed on all the surfaces of the carcass, with the possible exception of the end surfaces which are not readily presented to the action of the blades 35 and 37 and, in order to insure a complete removal of the hair from all portions of the carcass, the machine is provided adjacent the ends of the drums 25 and 26 with scraping plates 40 which are secured to the end frames of the machine and which are provided on their inner sides with vertical blades 40$^a$ having sharpened inner extremities, as shown particularly in Fig. 5 and extending preferably in parallel relationship to each other. These scraping plates are preferably stationary and, as the carcasses are rolled about their longitudinal axes by the action of the revolving drums 25 and 26, the blades 40$^a$ engage the end surfaces of the carcass and effectually remove the hair therefrom.

The carcasses to be dehaired are fed into the machine over a feed board or chute which extends longitudinally of the machine at the front side thereof, being made up of a series of bars or brackets 42 which are secured to the adjacent frame members. The bars 42 of the chute are inclined downwardly and inwardly in order to direct the carcasses toward the lower drum 26. At the ends of the feed chute, there are mounted a pair of bearing brackets 43 having journaled therein a longitudinal shaft 44 which carries the feeding device or charging cradle 45 by which the carcasses are picked up from a tank 46 and then moved inwardly toward the dehairing drum. The tank 46 is adapted to contain a solution 47 of scalding water or the like by which the hair on the carcasses is loosened in readiness for being scraped from the hides by the action of the scraping blades heretofore described. The shaft 44 is provided at its ends with collars 48 which hold it against endwise movement and, between the bearing brackets 43, the shaft 44 has secured thereon a plurality of brackets 49 to each of which there is secured one of the angular arms or bars 50. These bars are spaced apart to correspond with the spacing of the brackets 49 and they are secured together by the longitudinal members 51, which may be located on opposite sides of the bars, as shown in Fig. 2. The bars 50 and the members 51 thus form a rack or cradle of angular cross section which is adapted to be dropped into the liquid in the tank 46 and to receive one or more carcasses which are moved into position over the rack while it is suspended in the tank as shown in Fig. 2. The rack or cradle is then elevated by rotating the shaft 44 in its bearings, with the result that the carcasses carried thereby are discharged and caused to slide downwardly and inwardly over the feed board 42 until they occupy the position 39 where they are dehaired by the scraping blades during the rotation of the drum. This angular movement of the feeding device or cradle is effected through connections made with a crank arm 52, secured on one end of the shaft 44, as hereinafter more fully described.

The discharge of the dehaired carcasses from the machine is controlled by a gate 55 which is mounted with its ends adapted to slide vertically in guideways 56 formed by spaced angle bars 57 which are attached to the frame members 19 and 23 at each end of the machine. The gate is provided at each end with projecting pins 58 which engage slots 59ª formed in operating levers 59 which are pivoted at 60 on brackets 61 carried by the upright frame members 62. These levers are pivotally connected at 63 to the links 64 which extend downwardly therefrom and which have connections for elevating the gate 55 simultaneously with the elevation of the dehairing drum 26 by the mechanism hereinafter described so that when this drum 26 is elevated for effecting the discharge of one or more dehaired carcasses from the machine, the gate 55 is automatically elevated to permit such discharge to take place.

The various parts described above are actuated by driving mechanism operated by an electric motor 65 which is mounted in an elevated position on a shelf 66 located at one end of the machine. The shaft 67 is provided with a sprocket pinion 68 arranged to drive a gear 69 through a chain 70. The gear 69 is fixed upon a stub shaft 71 carried by a bracket secured to one of the end frame members 23 and this gear and shaft also drive the sprocket gear 73 secured on the shaft and meshing with a chain 74. This chain extends downwardly at one end of the machine and drives a gear 75 secured upon the shaft 27 of the dehairing drum or roll 25. The drum 25 is thus driven at all times when the electric motor 65 is in operation.

The drum 26 is driven from the shaft of the drum 25 through a sprocket gear 77 which is fixed on the shaft 27 and which meshes with a chain 78 arranged to drive a large gear 79 fixed on the shaft 30 of the other dehairing roll, as shown in Fig. 4. The chain 78 is of such length as to permit the bearings of the shaft 30 to slide vertically in the guideways 32 while at the same time allowing the continued operation of the roll 26, so that when the roll is in its elevated position, as shown in Fig. 4, the rotation thereof is adapted to facilitate the operation of discharging a dehaired carcass from the machine.

The shaft 27 also serves to drive the means by which the roll 26 is elevated from its normal operating position shown in Fig. 2. At the end of the machine opposite that at which the motor 65 is located, the shaft 27 is provided with a pinion 81 arranged to drive a chain 82 which in turn meshes with and drives a sprocket gear 83 located upon a shaft 84 which rotates in bearings carried by the end frames of the machine. The shaft 27 is detachably connected with the pinion 81, which is rotatably mounted on the shaft, by means of a clutch 105 comprising a clutch member 105ª which is splined on the shaft and a complementary clutch member 105ᵇ which is formed integrally with the pinion 81. The pinion 81 is retained against endwise movement by a collar 105ᶜ fixed on the shaft and the clutch member 105ª may be moved into engagement with the clutch member 105ᵇ by a lever 106 having arms extending on opposite sides of the clutch member 105ª and provided with pins which engage an annular groove in the clutch member. When the clutch is disengaged, the operating connection from the source of power to all of the operating mechanism is broken except the connection to the continuously rotating drums. Upon the shaft 84 there is secured another pinion 85 which meshes with another chain 86 arranged to actuate a large gear 87 secured upon a cam shaft 88. This cam shaft is journaled in bearings 89 carried by the lower transverse frame member 21 and it extends throughout the length of the machine beneath the shaft 27 with a cam 90 secured upon each end thereof. The cams 90 are adapted to coact with rollers 91 each of which is mounted upon one arm 92ª of a bell crank lever 92 mounted at the end of the machine to pivot about a stub shaft 93 which is carried by one of the end frame members 22. The other arm 92ᵇ of each bell crank lever is provided at its end with a flattened portion 92ᶜ, forming a plate or flange which underlies the hub 31ª of one of the bearing blocks 31 in which the shaft 30 of the roll 26 is journaled. The cams 90, coacting with the rollers 91, are adapted to actuate the bell crank levers 92 to effect the elevation of the rolls or drums 26 after the drum has been actuated for a sufficient period of time in its lower position, shown in Figs. 2 and 6, to effect the dehairing of each carcass located in the machine. At the end of this predetermined period, the bell crank levers elevate the drum 26, under the influence of the cams 90, thus raising the drum to the position shown in Fig. 4. Each cam 90 has a portion 90ª of its outer cam surface arranged concentrically about the axis of the shaft 88 so that this portion is of relatively small diameter and of considerable extent, for example, about one-half (½) of the angular distance around the shaft, so that when the rollers 91 are in engagement with these portions 90ª on the two cams, the dehairing drum 26 is permitted to remain in its lower position for a substantial period of time. At the end of this period, during which the carcasses are dehaired, the rollers 91 pass into engagement with the convex portions 90ᵇ of the cam surfaces, as shown in Fig. 2, and as the cams then continue to rotate in the direction indicated by the arrows 94, the bell crank levers 92 effect a gradual elevation of the drum 26 for the purpose of discharging the carcasses from the machine. At the end of the discharge operation, the rollers 91 pass into engagement with the portions 90c of the cam surfaces which are adapted to effect a relatively rapid return of the drum 26 to its lower running position. The relative positions of the parts, at the end of this return movement, are shown in Fig. 6.

In order that the discharge gate 55 may be operated in unison with the bell crank levers 92 by which the movements of the drum 26 are effected, the upper arms 92b of the bell crank levers are pivotally connected at 96 to the lower ends of the links 64 heretofore described so that when the drum 26 is elevated, as shown in Fig. 4, the gate 55 is simultaneously raised to its open position. When the roll 26 has again been lowered to the position shown in Fig. 6, in readiness to receive new carcasses to be dehaired, the gate 55 is again in its lower position to prevent the discharge of the carcasses over the roll 25.

In addition to operating the cams 90, the shaft 88 also operates a crank arm 98 which is fixed thereon adjacent to the cam and which is pivotally connected at the point 99 with a connecting rod 100. This connecting rod is pivotally connected at 101 with the crank arm 52 previously described by which the rack or cradle 45 is operated. The connecting rod 100 includes a clevis 102 threadedly engaged by the rod and a nut 103 holds the parts in adjusted position so that the length of each connecting rod may be regulated as desired. The location of the crank arm 98 with respect to the cams 90 is such that the rack 45 is in its lowermost position within the tank 46, as shown in Fig. 2, when the cams 90 are in a position corresponding to the completion of the dehairing of one or more carcasses then in the machine. Assuming that the operator has placed one or more new carcasses over the rack 45 within the tank 46, these carcasses are elevated by the rack during the time that the dehairing roll 26 is being elevated by the cams 90, as shown in Fig. 4. This elevation of the rack 45 continues while the roll or drum 26 is being lowered by the portions 90c of the cams so that when the drum 26 has again returned to its lowermost position, as shown in Fig. 6, with a corresponding lowering of the gate 55, the rack 45 will have reached the elevated position shown in Fig. 6 whereby the carcasses to be dehaired are discharged downwardly over the feed board 42 into the machine. In this way, successive carcasses, or groups of carcasses, may be introduced into the machine without loss of time and without any substantial idle periods between successive dehairing operations. As will be apparent from the drawings, the relative sizes of the pinions and gears on the connected shafts is such that both drums rotate with considerable speed, and the drum 26 revolves at a speed less than that of the drum 25, a feature which is found to produce desirable results in the dehairing of a carcass.

Although one form of the invention has been shown and described by way of illustration, it will be understood that it may be conducted in various other embodiments within the scope of the appended claims.

I claim:

1. The combination in a dehairing machine, of a rotatable device provided with a plurality of scrapers, said device being mounted to support a carcass positioned above it, means for rotating said device for dehairing said carcass, and means for moving said device bodily to discharge said carcass from said machine.

2. The combination in a dehairing machine, of a rotatable drum provided with a plurality of scrapers on its outer surface, means for rotating said drum for dehairing a carcass positioned thereon, and means for moving said drum transversely to its axis of rotation for discharging said carcass from said machine.

3. The combination in a dehairing machine, of a rotatable dehairing device, means for rotating said device, and means for moving said device bodily transversely to its axis while it is in rotation for discharging a carcass from said machine.

4. The combination in a dehairing machine, of means forming a dehairing chamber having an exit, a rotatable dehairing device mounted in said chamber, means for rotating said device with the upper part thereof moving toward said exit and adapted to support a carcass, and means for moving said device bodily in a direction transverse to its axis of rotation for discharging a dehaired carcass through said exit.

5. The combination in a dehairing machine, of a pair of dehairing devices, means for rotating said devices in the same direction for dehairing a carcass, and means for moving one of said devices bodily for discharging the dehaired carcass from the machine.

6. The combination in a dehairing machine, of a pair of rotatable drums having scrapers projecting substantially tangentially therefrom and adapted to support a carcass, means for rotating said drums, and means for moving one of said drums transversely to its axis of rotation to discharge said carcass from the machine.

7. The combination in a dehairing machine, of a pair of rotatable drums mounted at different elevations, scraping blades mounted on each of said drums, means for rotating said drums in the same direction with the drum at the lower level having a lesser speed of rotation than the other drum, and means for elevating said last-named drum to discharge a carcass from said machine.

8. The combination in a dehairing machine of a pair of rotatable dehairing devices adapted to remove the hair from a carcass, means for rotating said devices, a gate for controlling the discharge of a carcass from said machine, and means for conjointly elevating said gate and elevating one of said devices for effecting the discharge thereby of said carcass.

9. The combination in a dehairing machine of a pair of rotatable dehairing devices adapted to remove the hair from a carcass, a gate for controlling the discharge of said carcass from said machine, and means for opening said gate and simultaneously effecting bodily movement of one of said devices for discharging said carcass.

10. The combination in a dehairing machine of a pair of rotatable dehairing devices, means for rotating said devices, means for elevating one of said devices to discharge a dehaired carcass from said machine and then returning said last-named device to its normal position, and means operated in unison with said last-named means for charging a new carcass into said machine when said last-named device is restored to its normal position.

11. The combination in a dehairing machine of a pair of rotatable dehairing devices, means for rotating said devices, a gate for controlling the discharge of a dehaired carcass from said machine, means for effecting bodily movement of one of said devices for discharging a dehaired carcass and simultaneously opening said gate, said last-named means being adapted to restore said last-named device to its normal position after the carcass has been discharged, and means operated when said last-named device is restored to its normal position for charging a new carcass into said machine.

12. The combination in a dehairing machine, of rotatable dehairing devices adapted to remove the hair from the lateral portions of a carcass, and means at opposite ends of the devices and coacting with the latter to remove the hair from the end portions of said carcass.

13. The combination in a dehairing machine, of rotatable dehairing devices adapted to remove the hair from the lateral portions of a carcass, and stationary means positioned at opposite ends of said devices and coacting with the latter to remove the hair from the end portions of said carcass.

14. The combination in a dehairing machine, of a pair of rotatable dehairing devices, means for actuating said devices to remove the hair from the lateral portions of a carcass, and stationary scraping blades mounted at opposite ends of said rotatable devices for removing the hair from the end portions of said carcass.

15. The combination in a dehairing machine, of a pair of rotatable dehairing devices positioned substantially side by side and adapted to support a carcass positioned directly thereon, means for rotating said devices in the same direction to effect the dehairing of said carcass, and means for elevating one of said devices during its rotation to effect discharge of said carcass over the other of said devices.

16. The combination in a dehairing machine of means forming a dehairing chamber having an exit, a pair of rotatable dehairing devices positioned substantially side by side in said chamber and adapted to support a carcass positioned directly thereon, means for rotating said devices in the same direction for effecting the dehairing of said carcass, and means for elevating one of said devices during its rotation for effecting discharge of said carcass over the other of said devices through said exit.

JOHN B. MIDDAUGH.